Figure 1:
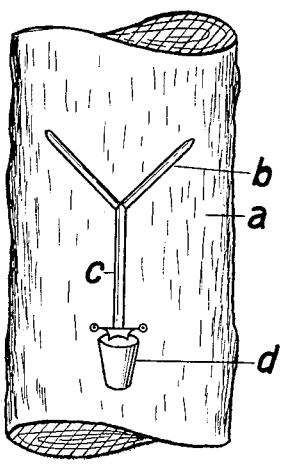

Dec. 8, 1936. M. HESSENLAND ET AL 2,063,163
METHOD OF OBTAINING RESIN FROM TREES
Filed Aug. 28, 1935

INVENTORS,
Max Hessenland.
Reinhold Bötticher.
By Stone, Boyden & Mack
ATTORNEYS Patented Dec. 8, 1936

2,063,163

UNITED STATES PATENT OFFICE 2,063,163

METHOD OF OBTAINING RESIN FROM TREES

Max Hessenland and Reinhold Bötticher, Konigsberg, Germany

Application August 28, 1935, Serial No. 38,266

4 Claims. (Cl. 47—10)

Our invention relates to a method of obtaining resin from trees, and more particularly to a method in which the bark of the trees is incised at the stem.

It is an object of our invention to effect a more rapid flow of the resin from the incision in the bark.

It is another object of our invention to obtain a larger quantity of resin from a given incision.

To this end, an incision is made in the bark of the tree by notching, scratching, or the like, and a gaseous stimulus is blown against the incision. A stimulus is an agent for accelerating the flow of the resin from the incision.

Suitable stimuli are, for instance, hydrochloric acid and ammonia.

By using the stimulus in gaseous condition, as described, the desired objects of accelerating the flow of the resin, and of obtaining more resin from an incision, are obtained.

We are not limited to trees of any definite kind, but may use our method on a great many varieties of trees, and, with particular advantage, on trees which supply resin, and not latex, for instance, conifers. The principal constituents of resin from such trees are turpentine oil and colophony.

In the accompanying drawing, our method is schematically illustrated by way of example.

Figure 2:
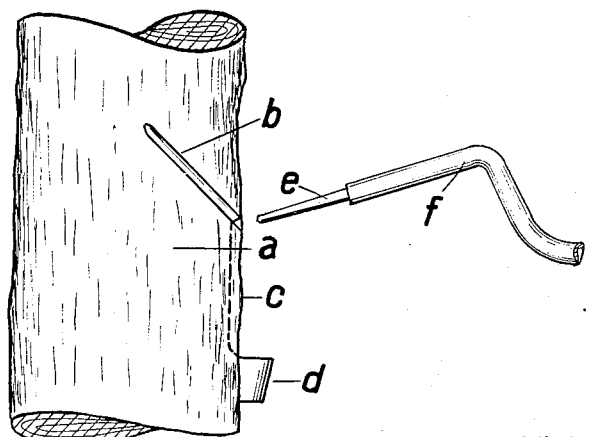

In the drawing:

Fig. 1 is an elevation of a tree showing a V-notch in its bark, and a collecting vessel at the lower end of the notch, Fig. 2 is a side elevation showing the tree as viewed from the left in Fig. 1.

Referring now to the drawing, $a$ is a portion of a tree stem, with a V-shaped notch $b$ in its bark. This notch is shown by way of example only, since the incision may be of any desired shape. A vertical notch $c$ is connected to the lower end of the V-shaped notch $b$ and conducts the resin to a receptacle $d$. The incision or notch $b$ is made in the usual manner, and penetrates to the sap wood of the stem portion $a$.

Immediately after the incision has been made, a jet of a stimulus is blown against it, preferably through a nozzle $e$ which is connected to a flexible tube $f$ so that it can be moved in all directions.

The gaseous stimulus exerts an irritating action on the tree, causing the resin to flow out faster, and more resin to flow out than would be the case without the use of the gaseous stimulus.

As mentioned, various substances may be used as gaseous stimuli. Preferably, we use gaseous acid, and, in particular, gaseous hydrochloric acid.

Apparatus for discharging gas are old in the art, and any suitable apparatus may be used instead of the nozzle $e$ and the flexible tube $f$, as shown. It is only important that the acid or other agent should be discharged under pressure.

We claim:

1. In a method of obtaining resin from trees, the formation of a wound in the bark of the tree and in the wood beneath the bark, shortly after the formation of the fresh wound the treatment of the open fresh wound with intensive short stimulation with a gaseous chemical agent, and collecting the resin flowing from the wound.

2. In a method of obtaining resin from trees, the formation of a wound in the bark of the tree and in the wood beneath the bark, shortly after the formation of the fresh wound the treatment of the open fresh wound with intensive short stimulation with a gaseous acid as an irritant, and collecting the resin flowing from the wound.

3. In a method of obtaining resin from trees, the formation of a wound in the bark of the tree and in the wood beneath the bark, shortly after the formation of the fresh wound the treatment of the open fresh wound with intensive short stimulation with gaseous hydrochloric acid as an irritant, and collecting the resin flowing from the wound.

4. In a method of obtaining resin from trees, the formation of a wound in the bark of the tree and in the wood beneath the bark, immediately after the formation of the fresh wound the treatment of the open fresh wound with intensive short stimulation with a gaseous chemical agent, and collecting the resin flowing from the wound.

MAX HESSENLAND.
REINHOLD BÖTTICHER.